United States Patent
Dommety et al.

(10) Patent No.: US 6,654,361 B1
(45) Date of Patent: Nov. 25, 2003

(54) METHOD FOR REROUTING AND ROUTE OPTIMIZATION FOR HANDOFF MANAGEMENT IN A COMMUNICATIONS NETWORK

(75) Inventors: Gopal K. Dommety, Columbus, OH (US); Malathi Veeraraghavan, Atlantic Highlands, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/158,402

(22) Filed: Sep. 22, 1998

Related U.S. Application Data

(60) Provisional application No. 60/060,749, filed on Sep. 22, 1997.

(51) Int. Cl.⁷ .......................... H04Q 7/00; H04L 12/28; G01R 31/08
(52) U.S. Cl. .................. 370/331; 370/351; 370/395.52; 370/238.1
(58) Field of Search ................. 370/338, 384, 370/328, 408, 396, 331–336, 238.1, 341, 351, 360, 310, 400, 238, 352, 395.52, 397, 395.64, 395.65, 395.5; 455/433–439, 400, 445

(56) References Cited

U.S. PATENT DOCUMENTS

| | | | | |
|---|---|---|---|---|
| 4,745,593 A | * | 5/1988 | Stewart ..................... | 370/238 |
| 5,822,309 A | * | 10/1998 | Ayanoglu et al. ............ | 370/315 |
| 5,875,185 A | * | 2/1999 | Wang et al. ................ | 370/331 |
| 6,023,461 A | * | 2/2000 | Raychaudhuri et al. ..... | 370/331 |
| 6,075,777 A | * | 6/2000 | Agrawal et al. ............ | 370/329 |
| 6,094,424 A | * | 7/2000 | Kalmanek et al. .......... | 370/328 |
| 6,154,463 A | * | 11/2000 | Aggarwal et al. .......... | 370/408 |
| 6,222,820 B1 | * | 4/2001 | Hamami .................... | 370/218 |
| 6,240,078 B1 | * | 5/2001 | Kuhnel et al. ............. | 370/331 |
| 6,272,139 B1 | * | 8/2001 | Soncodi ..................... | 370/395 |
| 6,304,549 B1 | * | 10/2001 | Srinivasan et al. ......... | 370/398 |

OTHER PUBLICATIONS

C. Perkins, *IP Mobility Support*, RFC 2002 (1996).
Santhanam Srinivasan, *Low Overhead Fault Tolerance Schemes for Distributed Systems* (1995) (Ph.D. thesis, Princeton University).
The ATM Forum Technical Commitee, *Private Network–Network Specification Interface* v1.0 (PNNI 1.0), Mar. 1996, af–pnni–0055.000.
M. Veeraraghavan and G. Dommety, *Mobile Location Managment in ATM Networks*, 15 IEEE J. Selected Areas COMM. (1997).

(List continued on next page.)

*Primary Examiner*—Kwang Bin Yao
*Assistant Examiner*—Hanh Nguyen

(57) ABSTRACT

A handoff scheme for a communications network is disclosed. In a first embodiment a procedure for finding an optimal path between an originating network node and a destination network node is integrated in the handoff procedure. An optimally routed connection is obtained by first determining an optimal "crossover node" along the existing path and then the handoff is effected by altering the existing connection route so that it travels along the existing path until it reaches the crossover node, where the path then varies from the original route, and a new segment between the crossover node and the new location is established. Then the call is switched to the new segment and the corresponding old segment on the old connection is released. In an alternative embodiment, the handoff procedure is performed first by completing a fast reroute connection using a prior art path extension method. This results in a quick, but suboptimal handoff connection. Once the handoff is completed, the route is optimized by selecting a segment on the suboptimal connection for rerouting and then utilizing the method of the first embodiment to establish an optimally routed connection.

42 Claims, 8 Drawing Sheets

OTHER PUBLICATIONS

A. Acharya et al., *Handoff and Location Management in Mobile ATM Networks*, PROC. 3RD INT'L. Workshop Mobile Multimedia Comm. (1996).

David B. Johnson and Charles Perkins, *Mobility Support in IPv6*, Internet Draft, draft–ietf–mobileip–ipv6–02.txt, Nov. 1996. Work in progress.

David B. Johnson and Charels Perkins, *Route Optimization in Mobile IP*, Internet Draft, draft–ietff–mobileip–optim–04.text, Feb. 1996. Work in progress.

M. Veeraraghavan et al., *Implementation and Analysis of PCC (Parallel Connection Control)*, IEEE INFOCOM (1997).

G. Dommety et al., *Route Optimization in Mobile ATM Networks*, ACM/IEEE Int'L. Conf. Mobile Computing and Networking (MOBICOM '97) (1997).

Yi–Bing Lin, "Modeling Hierarchical Microcell/Macrocell PCS Architecture", IEEE Int'l. Conf. Comm. 405–409 (1995).

Gopal Dommety et al., "Route Optimization in Mobile ATM Networks", ACM/IEEE Int'L. Conf. Mobile Computing and Networking ( MOBICOM '97) (1997).

R. Yuan et al., *A Signalling and control Architecture for Mobility Support in Wireless ATM Networks*, Proc. IEEE ICC (1996).

M. Veeraraghavan et al., *Mobility and Connection Management in a Wireless ATM LAN*, 15 IEEE J. on Selected Areas in Comm. 50–68 (1997).

W. Chen, *Impact of Anchor Rerouting Based Inter–Switch Handoffs in Wireless ATM Acces Networks*, Proc. IEEE ICC (1996).

B. A. Akyol and D. C. Cox, *Rerouting for Handoff in a Wireless ATM Network*, IEEE Personal Comm. Mag. 26–33 (1996).

C.–K. Toh, *Performance Evaluation of Crossover Switch Dicovery Algorithms for Wireless ATM LANs*, Proc. IEEE INFOCOM 1380–1387 (1996).

P. P. Mishra and M. B. Srivastava, *Evaluation of Virtual CirCuit Rerouting Strategies for Mobility Support in ATM Networks*, IEEE Int'l. Conf. Distributed Computing Systems (ICDCS) (1997).

IS41 MAP.

GSM MAP.

J. S. M. Ho and I. F. Akylidiz, *Local Anchor Scheme for Reducing Location Tracking Costs in PCNs*, ACM MOBICOM 181–193 (1995).

S. Mohan and R. Jain, *Two User Location Strategies for Personal Communications Services*, IEEE Personal Comm. 42–50 (First Quarter 1994).

H. Mitts et al., *Lossless Handover for Wireless ATM*, Proc. ACM MOBICOM 85–96 (1996).

D. Raychaudhuri and N.D. Wilson, *ATM–Based Transport Architecture for Multiservices Wireless Personal Communication Networks*, 12 IEEE J. Selected Areas Comm. 1401–1414 (1994).

J. Porter and A. Hopper, *An ATM Based Protocol for Wireless LANs*, Olivetti Tech. Report (1994).

S. K. Biswas and A Hopper, *A Representative Based Architecture for Handling Mobility in Connection Oriented Radio Networks*, Proc. ICUPC 848–852 (1995).

\* cited by examiner

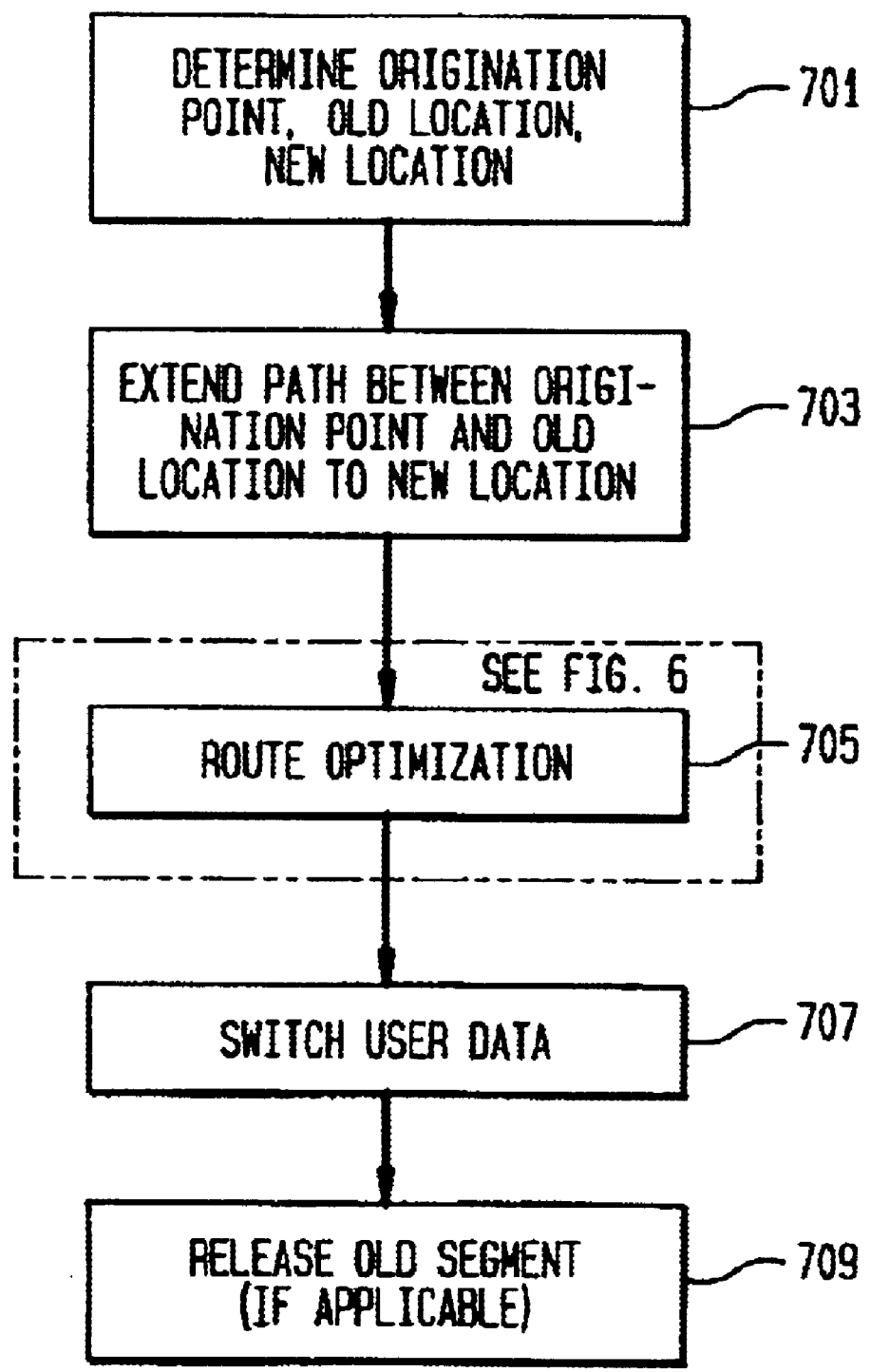

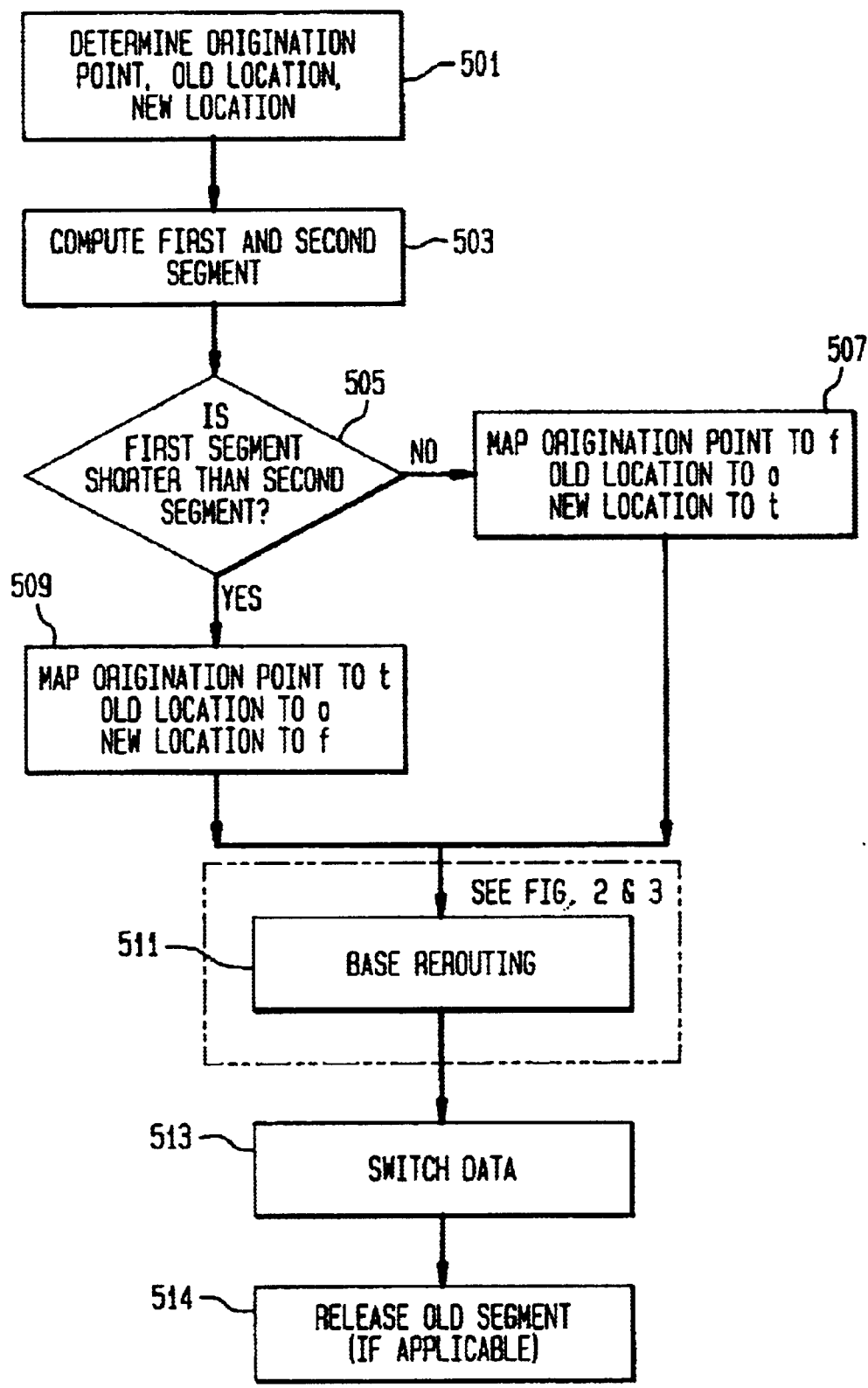

US 6,654,361 B1

METHOD FOR REROUTING AND ROUTE OPTIMIZATION FOR HANDOFF MANAGEMENT IN A COMMUNICATIONS NETWORK

REFERENCE TO PROVISIONAL APPLICATION

This application is based on a Provisional Application Serial No. 06/060,749, filed on Sep. 22, 1997.

FIELD OF THE INVENTION

The present invention relates to communications networks including mobile asynchronous transfer mode (ATM) and Internet-Protocol (IP) networks. More particularly, the invention relates to route optimization and handoff management in communication networks.

The term "network node," as used herein, is a system in a communications network that performs a switching or routing functions. A network node can be an access node if it has links to endpoints (users). A network node can be a transit node if all it slinks are to other network nodes with no links to endpoints. Examples of network nodes are ATM switches, IP routers, SONET crossconnects, telephony switches, WDM (Wavelength Division Multiplexed) optical crossconnects and other similar systems.

An network node can be an "originating network node" (the network node from which a communication path originates; a "current-location network node" (the network node to which a mobile or remote user is currently connected to communicate with the originating network node); and a "new-location network node" (the network node to which the remote user will be handed off to).

In a mobile network, the term "network node," refers to an access point or a base station (which may include an ATM switch).

The term "mobile user," as used herein, refers to a person connected to (or who will be connecting to) a current-location network node to establish communication with the originating network node.

The term "call," as used herein, refers to any connection (e.g., voice, data, etc.) between an originating party and a receiving party over a communication path.

The term "communication path," as used herein, refers to the path from the originating party to the receiving party over the network.

BACKGROUND OF THE INVENTION

The use of ATM and IP technology in mobile communication networks is becoming increasingly common. In mobile ATM networks, "handoff procedures" and "location management procedures" are needed to support user mobility. Handoff procedures are needed to reroute connections of a call-in-progress when a mobile user is moving (and therefore changing the route that the call takes). Location management consists of tracking mobile users and locating them for delivering a yet-to-be-established incoming call to the mobile user. In both sets of procedures, paths taken by connections could become "sub-optimal," i.e., the paths taken may not be the best paths between the two endpoints of the connection.

Handoff management consists of procedures to reroute connections on which a mobile user is communicating while moving. If a connection exists between a first network node and a second network node, and mobile user moves to a third network node, connections need to be rerouted. Thus, a rerouting is required whether the mobile user which initiated the call moves, or the mobile user which received the call moves.

Various prior art schemes for handoff management are known and generally operate in one of two ways. A first method, called "path rerouting," is described with reference to FIG. 1A. By this method, a mobile user 110 using an connection 112 between an originating network node 114 and a nearby network node 116 is moving towards a different network node 118. The system recognizes the movement of the mobile user 110 and sets up a new connection 120 (shown in dotted lines) between originating network node 114 and the destination network node 118. Once the new connection 120 is established, the connection between originating network node 114 and the old network node 116 is dropped, with the communication by the mobile user 116 with originating network node 114 continuing in a virtually "seamless" manner.

In the scheme illustrated in FIG. 1A, since the entire connection is being rerouted (i.e., there is no common path between the first connection 112 and the second connection 120), handoff latency is an issue. Considerable time and network resources are spent establishing the new connection 120 over an entirely new path before the old path can be dropped.

An alternative handoff method, called "path extension," is illustrated with reference to FIG. 1B. Under this method, the path 112 between originating network node 114 and the new network node 118 is established by simply extending a new path 122 (shown in dotted line) to the new network node 118 from the old network node 116, in a "connect-the-dots" fashion. Using this method, lower handoff latencies can be achieved because the old and new base stations are simply interconnected as needed. However, the path taken by the connection will often be sub-optimal, because the new path added on to the old one may follow a circuitous route.

Neither of the prior art handoff methods determine whether the route established between the originating point and the network node closest to the mobile user is optimal, nor do they optimize the connection path to establish such an optimal route.

Thus, there exists a need for a system which may provide an efficient handoff management scheme/method to optimize routes of connections such that an efficient usage of network resources results.

SUMMARY OF THE INVENTION

Two handoff schemes are disclosed herein. In a first embodiment a procedure for finding an optimal path between an originating network node and a destination network node is integrated in the handoff procedure. An optimally routed connection is obtained by first determining an optimal "crossover node" along the existing path and then the handoff is effected by altering the existing connection route so that it travels along the existing path until it reaches the crossover node, where the path then varies from the original route, and a new segment between the crossover node and the new location is established. Then the call is switched to the new segment and the corresponding old segment on the old connection is released.

In an alternative embodiment, the handoff procedure is performed first by completing a fast reroute connection using the prior art path extension method. This results in a quick, but sub-optimal handoff connection. Once the handoff is completed, the route is optimized by selecting a segment on the sub-optimal connection for rerouting and then utilizing the method of the first embodiment to establish an optimally routed connection.

The method of determining an optimal connection path and rerouting the existing connection path to this optimal connection path, as described in the first embodiment, is applicable to all communication networks deploying connection-oriented technologies. These communications networks include land-line networks and mobile networks.

Similarly, the method of route optimization for optimizing a suboptimal connection, as described in the second embodiment, is applicable to all communication networks deploying connection-oriented technologies. These communications networks include land-line networks and mobile networks.

Within communications networks, the kinds of networks to which the present invention is applicable includes flat networks, hierarchical networks, and PNNI-hierarchical networks.

BRIEF DESCRIPTION OF THE DRAWINGS

FIG. 5 is flowchart illustrating an alternative embodiment of the present invention; and FIG. 6 is a flowchart illustrating the steps involved in the route optimization step of FIG. 5.

DETAILED DESCRIPTION OF THE PREFERRED EMBODIMENT

As described above, the present invention involves the rerouting of a call-in-progress to achieve an optimal communication path or route. In a first embodiment, the optimal communication path is achieved by locating a crossover node, which is defined as an access node or a transient node at which there will be as much overlap as possible between the old path and the new path. Once the location of the crossover node is determined, a route is established along the new path (which includes the portion of the old path that coincides with the new path), the handoff takes place and then the unnecessary portion of the old path is dropped.

Figure 1A:
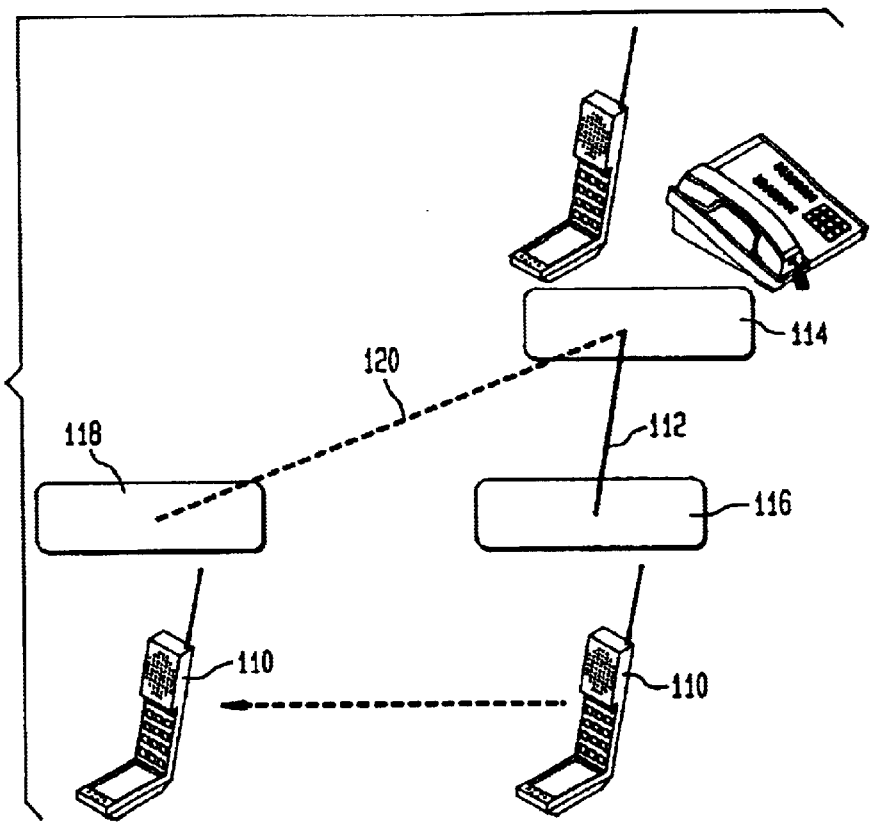
FIG. 1A is a block diagram of a prior art handoff management scheme.
Figure 1B:
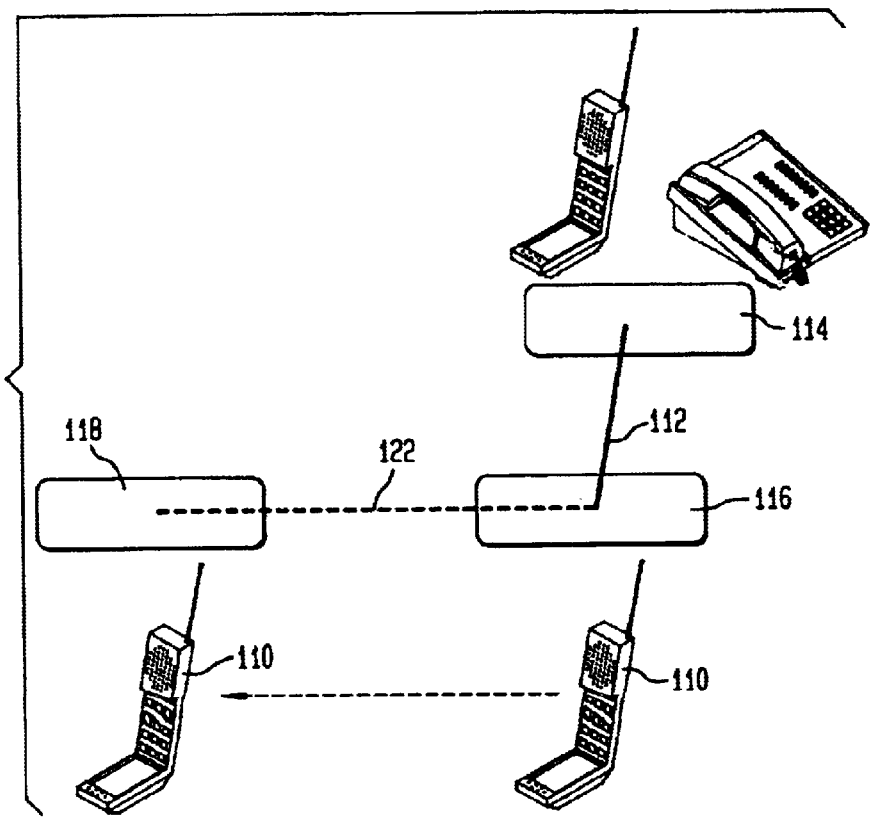
FIG. 1B is a block diagram of different prior art handoff management scheme.
Figure 2:
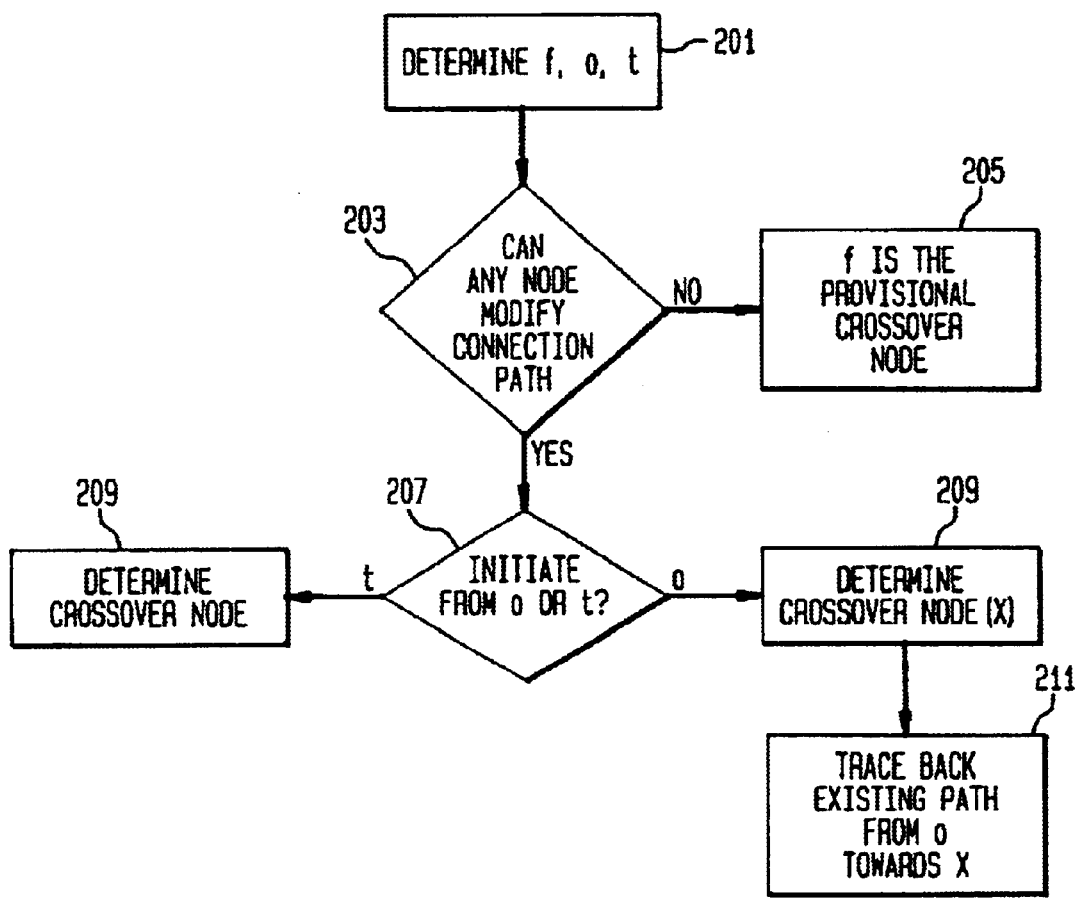
FIG. 2 is a flowchart illustrating an example of the steps involved in determining the location of a crossover node X in accordance with the present invention.

FIG. 2 is a flowchart illustrating an example of the steps involved in determining the location of a crossover node X for flat networks (as discussed below, the steps involved in the determination of the location of the crossover node for hierarchical networks varies from those used for flat networks). For the purposes of this example, assume that a connection exists (there is a call-in-progress) between a first network node f and a second network node o, and a new connection is desired between first network node f and a third network node t. If a connection exists between a first network node and a second network node, and the user has moved from second network node to a third network node, connections need to be rerouted.

In a mobile network, a rerouting is required whether the mobile which initiated the call moves, or the mobile which received the call moves. In a land-line network, a rerouting is required where a user was located at second network node and has moved to third network node.

At step 201, the system determines that there is an existing path established between first network node f and second network node o and that a new path is desired between first network node f and third network node t.

Some networks require that only the originating network node (first network node f in this example) can modify (reroute) the connection. Thus, at step 203, a determination is made as to whether any node can modify the connection path or only the originating network node. If the connection can be rerouted only by first network node f, then the process proceeds to step 204, where it is determined that first network node f is the optimal crossover node X.

However, if at step 203 it is determined that any network node (node) can modify the connection path, the process moves to step 207. At step 207, it is determined whether to initiate crossover node determination from node o or node t.

It is desirable to initiate the crossover node determination at node t, since the path between node t and the eventual crossover node can be determined while setting up the new segment. However, in many networks, only node o can initiate the crossover node determination because in such networks node t does not have available the detailed information concerning the existing connection. With node o initiating the crossover node determination, the new segment cannot be set up until after the crossover node is determined.

In step 209, the crossover node X is determined. The crossover node is an network node on the f-o path to be selected as the point for switching the old connection to the desired new connection. To determine the crossover node X, the network computes the shortest path along preexisting network nodes between f and t (the f-t path), and then compares the f-t path to f-o path. The endpoint of the coinciding portions of the f-t and f-o paths defines the location of the crossover node (X), this endpoint is the point along the coincident portion f farthest from f. The path f-X-t is the desired new connection because the f-X-t path is the shortest path between f and t which takes into account the coincident portions of the f-t and f-o paths. In this case, the X-t segment is the new segment, and the X-o segment is the corresponding old segment.

If node o initiates the optimal crossover node determination the existing path is also traced back from o towards t at step 211.

Figure 2A:
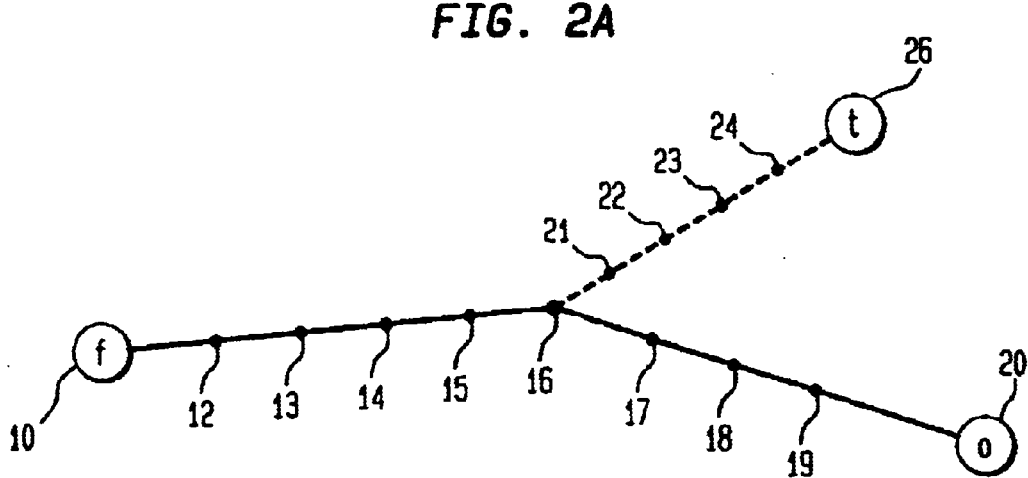
FIG. 2A is a diagram illustrating the steps of FIG. 2.

FIG. 2A illustrates the steps of FIG. 2 by way of example. In FIG. 2A, an old connection exists between node 10 and node 20. A new connection is desired between node 10 and node 26. The old connection path follows nodes {10, 12, 13, 14, 15, 16,17, 18, 19, 20}. The shortest path between f and t follows nodes {10, 12, 13, 14, 15, 16, 21, 22, 23, 24, 26} Node 16 is the crossover node X because f-o and f-t overlap along the path location of node 16. Once the new path is established, the handoff takes place and the X-o segment is dropped.

The base rerouting for hierarchical networks is similar but the crossover node determination varies.

A hierarchical network is a network where the nodes are grouped in various groups at multiple levels. A group is a plurality of nodes logically connected to form a group. Each peer group has an elected group leader. Nodes within a group exchange detailed information about topology, routing and loading. The group leader of each group represents all nodes within its peer group at the higher-level and sends summarized topology or loading information about its group to its ancestors at a higher level.

The levels within a hierarchical network may be logical or physical. The node groups are used by the network for switching and setting up calls.

The hierarchical networks are preferred for scalability reasons. A PNNI based network is a one particular type of hierarchical network. In a PNNI network, the nodes are arranged in a hierarchical manner with peer groups located at each hierarchical level. A peer group is a plurality of nodes logically connected to form a group. Each peer group has an elected Peer Group Leader (PGL). Nodes within a peer group exchange topology, routing and reachability information using the PNNI routing protocol. The PGL of each peer group represents all nodes within its peer group at the higher-level and sends summarized topology/loading/reachability information about its lower-level peer group to its peers in the higher-level peer group. Each higher-level peer node broadcasts this summarized information to all its nodes in the lower-level peer group. Using this technique, each node has topology/loading/reachability data about its own peer group and all its ancestor peer groups. The ancestor peer groups are corresponding peer groups at higher levels.

In a typical hierarchical network, PNNI signaling protocol standard is used in connection setup and connection release procedures. In order to set up a connection, the switch receives the connection setup request and determines the hierarchical source route for that connection. The computed hierarchical source routes are carried as DTL (Designated Transit List) parameters in the PNNI signaling SETUP messages. A DTL is a list of all node identifiers.

To set up a connection in a PNNI network, a stack of DTLs is used to specify the complete path of a connection from the current node to the destination with one DTL for each level. However, the exact list of nodes is not known due to the hierarchical nature of source routes. Therefore, the exact path within each peer group is computed at the ingress border node of the peer group, wherein the ingress border node is the node through which the connection setup procedure enters the peer group. The ingress border node then pushes a DTL specifying the path for that peer group on the stack of the DTLs. While computing the path through a peer group, the ingress border node of a peer group uses the next entry in the next DTL (the one corresponding to the next higher level peer group) as the target for exiting this peer group.

In case there is only one DTL remaining (i.e. the next DTL does not exist) the destination address is used to determine the route. The egress border node of a peer group pops DTLs from the stack that are exhausted (wherein the egress border node is the last node through which the connection being setup leaves the peer group). A call being set up according to a specified stack of DTLs may be blocked at a node due to a lack of sufficient resources or connectivity. In such situations, the call is cranked back (released) to the border node that created the unusable DTL and an alternate route is attempted. In a hierarchical network optimality of connection paths is regarded within the context of the hierarchical organization of switches. In other words, because of the hierarchical organization, the best path computed by the network may not be the true shortest-path.

Figure 3A:
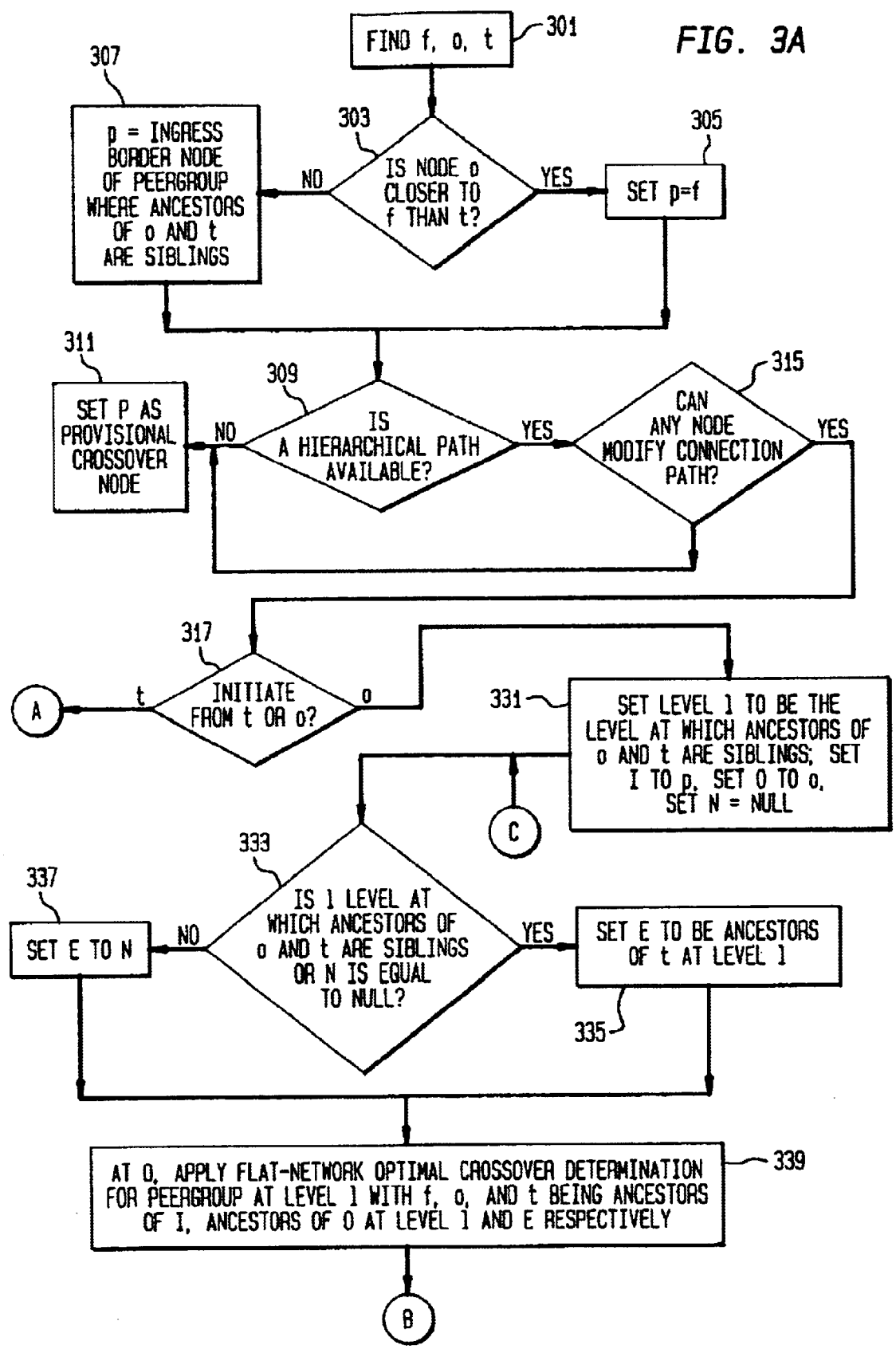
FIGS. 3A, 3B, and 3C comprise a flowchart illustrating the various steps required for crossover determination for a hierarchical network in accordance with the present invention.
Figure 3B:
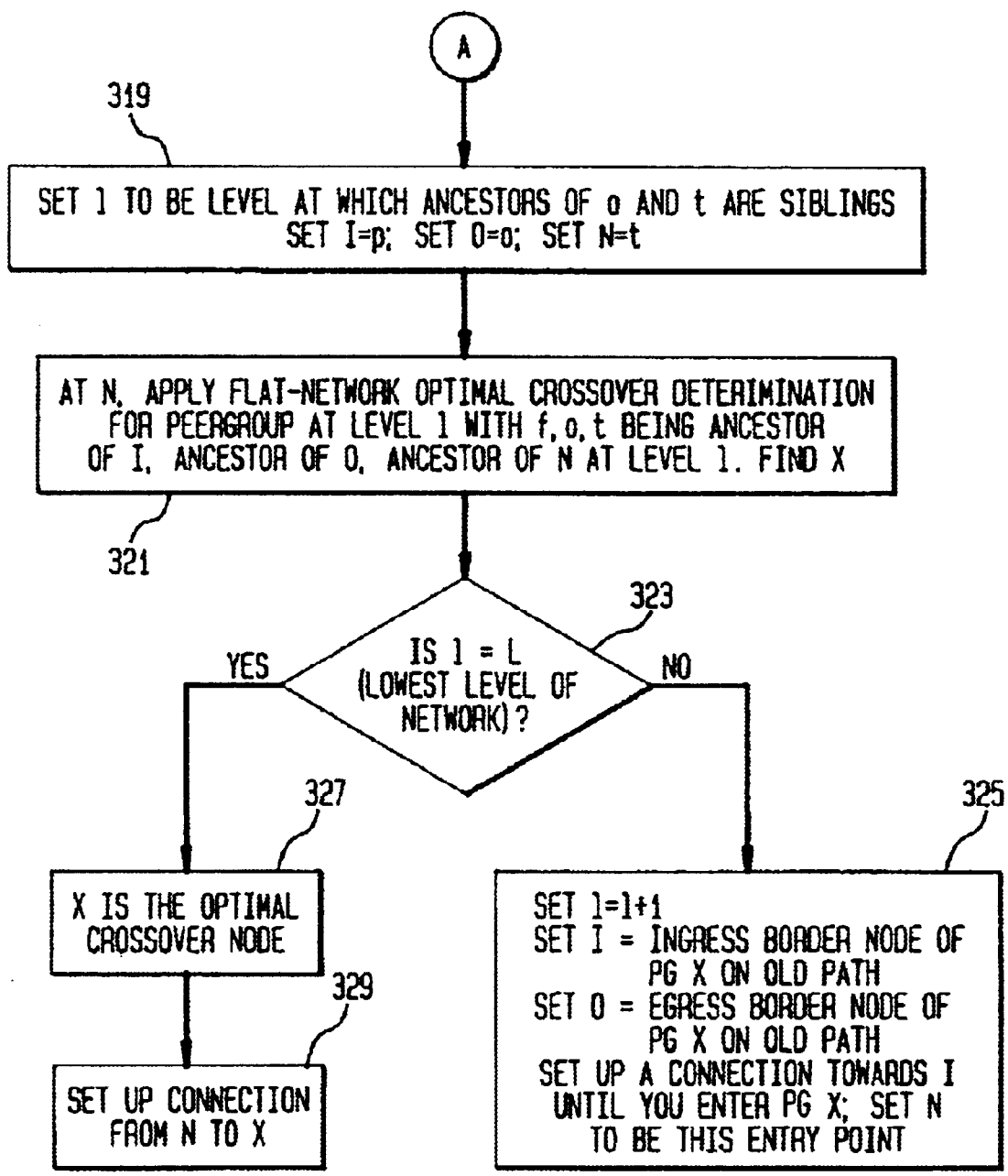
Figure 3C:
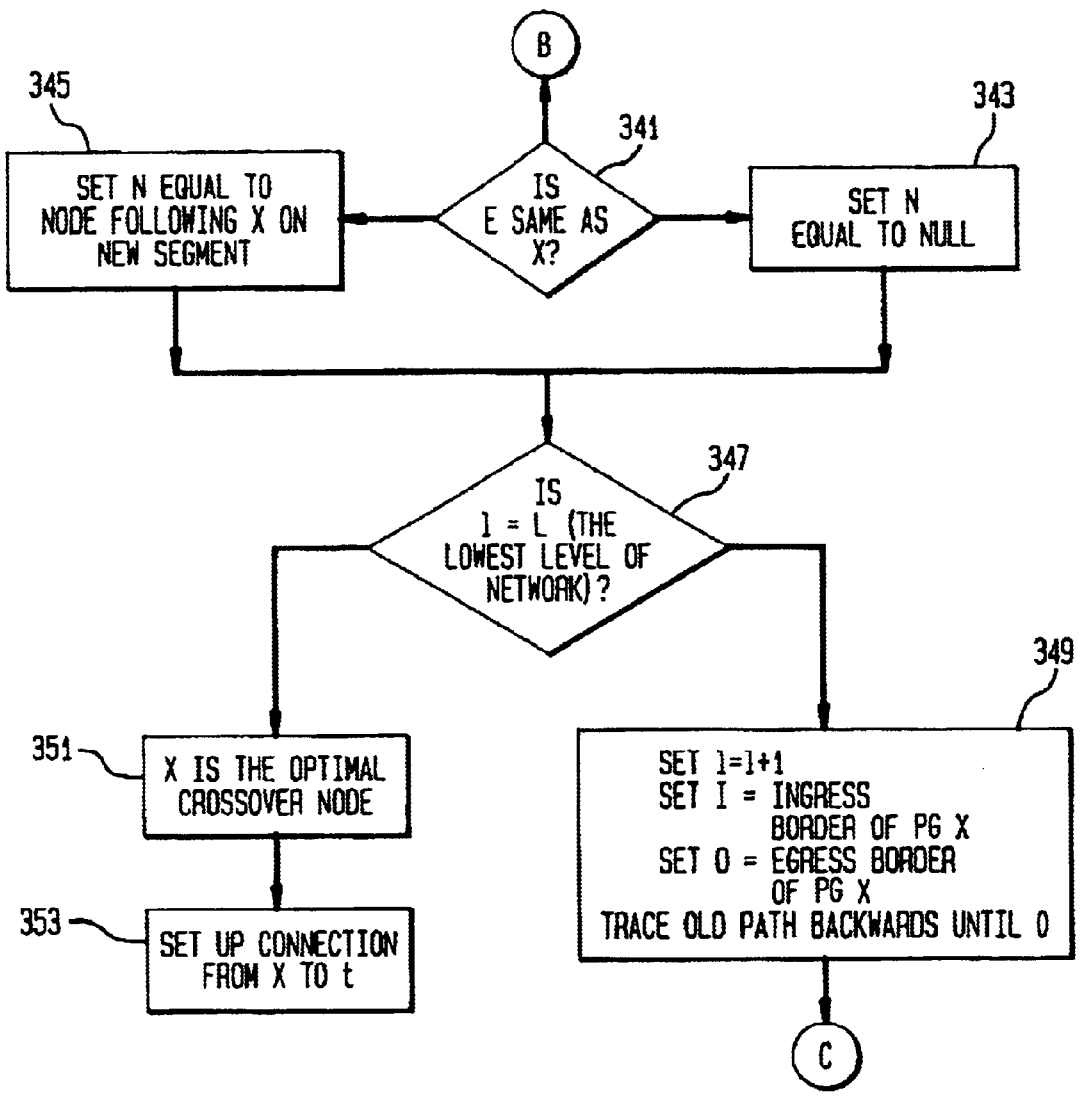

FIGS. 3A, 3B, and 3C illustrate the different steps required for crossover determination for a hierarchical network.

The process starts in 301 by selecting f, o, t nodes. The next step 303 is a decision function to determine whether node o is closer to node t or to node f. If node o is closer to node f than to node t the network computes in step 305 that f node must be a provisional crossover node (termed p).

However, if in step 303, it is determined that node o is not closer to node f than to node t, the process moves the step 307 where provisional crossover node p is computed by finding the ingress border node of the peer group in which ancestors of node o and node t are siblings.

The next step 309 is a decision function to determine whether a hierarchical path is available. In some hierarchical networks, a requirement does not exist that nodes must retain the hierarchical path after the connection has been established. Under these constraints, the answer to the decision function is "no" and the process moves to step 311 where provisional crossover node is determined as to be the required crossover node (X). This provisional crossover node is used to set up a new segment X-t, step 311.

However, if the answer to the decision function 309 is "yes", implying that under current hierarchical network standards, knowledge of the hierarchical path is retained, the process moves to another decision function, step 315, to determine if there is any other node, besides the node which initiated source routing (or created the DTL), which can modify the connection path. In some hierarchical networks, e.g., in a PNNI hierarchical network, a condition exists that the node which initiated the source routing can only compute and modify the connection path. Under these constraints, the answer to decision function at step 315 is "no" and the process moves to step 311 where provisional crossover node is determined as to be the required crossover node (X). This provisional crossover node is used to set up a new segment X-t.

If the answer to the decision function 315 is "yes", the process moves to another decision function 317. The decision function 317 determines whether crossover determination should be initiated from note t or from node o just as was done in the flat network example. Network makes this decision based on several parameters such as type of handoff, signaling procedures, and availability of existing path information.

In a typical network, only node o can initiate the crossover node determination. Node t can initiate the crossover node determination only if information regarding the detailed path of the existing connection is available. If node t initiates the crossover determination procedure, the crossover node determination can be executed while setting up a new segment.

If the crossover determination should be initiated from node t the process moves to step 319 where a level (l) is selected within the hierarchical network at which ancestors of node o node t are siblings. Also at step 319, a new parameter I is set equal to p (provisional crossover node), another new parameter O is set equal to o, and another new parameter N is set equal to t.

Then at step 321, flat-network optimal crossover determination procedure (step 209 of FIG. 2) is applied to find a local crossover node. The crossover determination procedure is applied at N for the peergroup at level l with f, o, and t being ancestors of I at level l, ancestor of O at level l, and N respectively. The local crossover node at this level is labeled X. The X may be an individual node or a peergroup.

The next step 323 is a decision function to determine if l is the lowest level (physical level) in the hierarchy. This step is required because in a hierarchical network, the higher levels are only logical levels, so the determination of the optimal crossover node requires iteratively determining crossover node X at a higher level where ancestors of node o and node t are siblings and ending at the lowest level which is the actual physical level.

If the answer to decision function 323 is "no", meaning that the lowest level has not been reached, the process moves to step 325 where we set l=l+1 to indicate a next level (a lower level in the hierarchy) has been selected. Also, I is now set to be the ingress border node of peer group X (PG X) on the old path. O is now set to be egress border node of PG X on the old path (I and O are located on the lowest level/physical level). Also at step 325, a connection is set up toward I until the connection enters the PG X. Also at step 325, N is set to be the entry point of this peergroup X.

Upon completion of step 325 the process then returns to step 321.

The iteration of step 321, 323, and 325 is repeated until the lowest level in the hierarchy has been reached. When in step 323 it is determined that the lowest level has been reached, the process moves to step 327 to identify node X as the optimal crossover node. In step 329, a new segment is set by setting up a connection from N to X.

Referring back to step 317 of FIG. 3A, if it is decided that crossover determination must be initiated from node o, in the next step 331, a level l is chosen at which ancestors of node o and ancestors of node t are siblings. Also at step 319, a new parameter I is set equal to p (provisional crossover node), another new parameter O is set equal to o, and another new parameter N is set equal to zero. The parameters I, O, N are introduced as tracking functions which assist in keeping track of essential information as the crossover node determination procedure iterates from one level to another level in the hierarchy.

The next step 333 is a decision function to determine whether level "l" is the level at which ancestors of o and t are siblings OR N is equal to null (zero). In first iteration, the answer to this decision function will always be yes, and the process will move to step 335 to set a new parameter E equal to the ancestor of t at this level (l). The parameter E is also introduced as a tracking function which assists in keeping track of essential information as the crossover node determination procedure iterates from one level to another level in the hierarchy.

However; if the answer to decision function 333 is "no", the process moves to step 337 to set a new parameter E equal to N.

The process then moves to step 339 a flat network determination step (step 209 of FIG. 2) is applied at O to determine a crossover node X for a peergroup at level l with f, o, t being the ancestor of I at level l, the ancestor of O at level l, and E respectively.

At next step 341 (FIG. 3C), it is determined whether node E coincides with crossover node X. If yes, N is set to be zero (null) at step 343. If no, at step 345, N is set to be equal to the node following crossover node X on the new segment (towards t).

The next step 347 is a decision function to determine whether the lowest level in the hierarchical network has been reached. If the answer is "yes", the lowest level has been achieved and at step 351 a determination is made that crossover node X is the optimal crossover node, and at step 353 a connection is setup between node X to node t.

However, if at decision function 347 it is determined that the lowest level has not been achieved. The process moves to step 349, where l is set to be equal to l+1 to indicate that a next level (a lower level in the hierarchy having PG X) has been selected. Also, I is now set to be the ingress border node of peer group comprising X (PG X) on the old path wherein the ingress border node is located on the lowest level. O is now set to be egress border node of PG X on the old path wherein the egress border node is also located on the lowest level. Also at step 349, the old path is traced backwards until O is reached.

Upon completion of step 349 the process then returns to step 333 (FIG. 3A) to start the next iteration of steps 333–349. In the next iteration, the flat network determination procedure is run at the next level (l+1). The iteration of 333–349 is repeated until the lowest level which is an actual physical level is reached, where X is the optimal crossover node at step 351, and a connection is set up from X to t at step 353.

In sum, to complete finding of the optimal crossover node in a hierarchical network with multiple levels, the flat-network optical crossover node determination is first exercised in the peer group where ancestors of o and t are siblings. This step may lead to a determination of an optimal crossover peer group, this optimal crossover peer group containing the optimal crossover node. However, given the hierarchical structure of the network, the o and the t has no detailed information about the inside structure of the optimal crossover peer group. For this purpose, the old connection is traced from o until the egress border node of the identified optimal crossover peer group on the old connection is reached. This egress node then performs the comparison routine for the paths through the optimal crossover peer group to determine the next lower level crossover peer group.

As the higher levels are only logical levels, the above iteration of determining the next lower level crossover peer group is repeated until a physical level is determined where the optimal crossover node is located.

Figure 4:
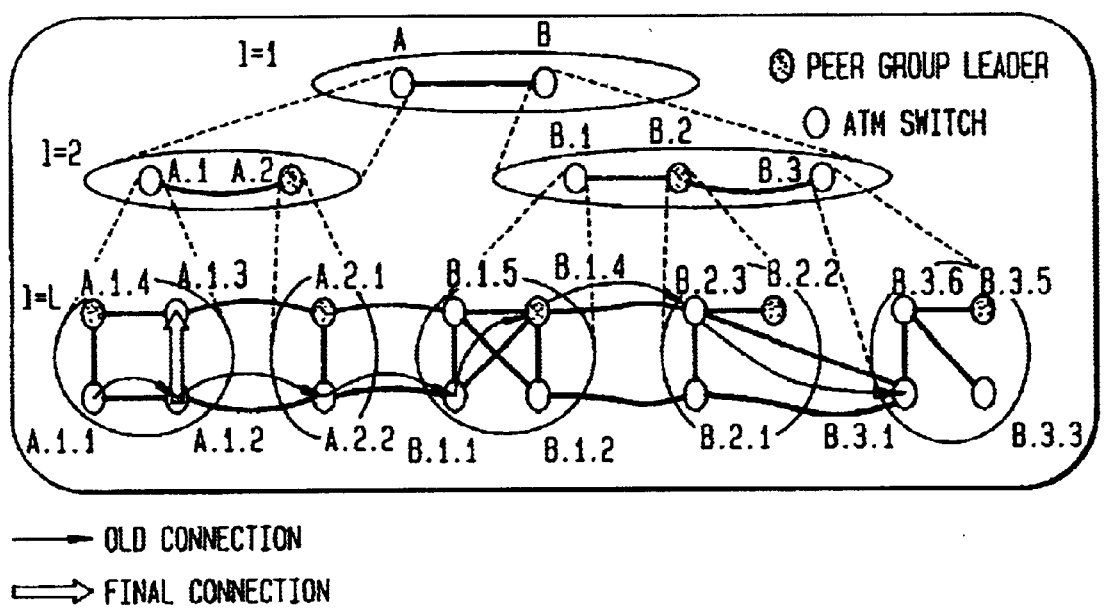
FIG. 4 is a diagram illustrating the steps set forth in FIGS. 3A–3C.

FIG. 4 is an exemplary illustration of the steps described in FIGS. 3A–3C. In this hierarchical network, there are three level l=1,2,3; l=1 being the top most level, l=3 being the lowest level.

In this example, The level 3 has five different peer groups PG1, PG2, PG3, PG4, PG5. Each peer group having its own PGL. The PG1 has four nodes, {A.1.1, A.1.2, A.1.3, A.1.4}, A.1.4 being the PGL. The PG2 has two nodes {A.2.1, A.2.2}; A.2.2 being the PGL. The PG3 has four nodes {B.1.1, B.1.2, B.1.4, B.1.5}; B.1.4 begin the PGL. The PG4 has three nodes {B.2.1, B.2.2, B.2.3}; B.2.2 being the PGL and the PG5 has four nodes {B.3.1, B.3.3, B.3.5, B.3.6}; B.3.5 being the PGL.

The level 2 is a logical level. It has two peer groups—PG6, PG7. The PG6 comprises ancestors of first two peer groups of the lower level (A.1 and A.2 nodes). The PG7 comprises the ancestors of remaining peer groups of the lowest level (B.1., B.2 B.3 nodes). The level 1 in the network comprises one peer group PG8 comprising ancestors of level 2 (A, B nodes).

In this example, node A.1.1 has the detailed information of all the members of its peer group (A.1.2, A.1.3, A.1.4 nodes) and its ancestors. The ancestors of node A.1.1 are A.1 (in level 2), A (in level 1).

For the purpose of this example, assume that a connection exists between A.1.1 and B.3.1 and a connection is desired between A.1.1 and A.1.3.

At step 301, f=A.1.1, o=B.3.1, t=A.1.3. Assume at step 303 that node o is equidistant to f and t, therefore provisional crossover node p is f, i.e., A.1.1 at step 305. Assuming, steps 309,315 answer as "yes", and assuming at step 317 that the crossover determination starts from node o, then at step 331, at level l=1, I=A.1.1, O=B.3.1, and N=0.

Next, decision function 333 obtain an answer "yes" because n=0; then at step 335, E is set to be equal to A (ancestor of t at level l=1). At step 339, a flat network crossover node determination is run at PG AB where f={A} (ancestor of I at level 1), o={B} (ancestor of O at level 1), and t=E={A}. Thus, crossover node X is A.

At step 341, it is determined that E (equal to A) is the same as X (equal to A), thus N is set equal to zero (null) at step 343. At step 347, it is determined that l is not the lowest level and, therefore, at step 349, next level l=2 (i.e, l+1) is selected. I is the ingress border of PG AB at the lowest level, thus, I is equal to A.1.1. O is the egress border node of PG AB, thus O is equal to A.2.2. Then, the old path is traced until A.2.2.

The iteration then returns to step 333 and answer at step 333 is now "yes" because even though ancestors of o and t are not siblings at this level (l=2), N is equal to zero. The process moves to step 335 where E is set be equal to A.1 (ancestor of t at this level, l=2). Next, at step 339, the flat-network optimal crossover determination is applied at O (A.2.2) wherein f=A.1 (ancestor of I at level 2), o=A.2 (ancestor of O at level 2), t=E, i.e., A.1. Thus the optimal crossover node X at this level is A.1.

At step 341, it is determined that E is same as X, and N is set to zero at step 345.

At 347, it is determined that level 2 is not the lowest level of the network, thus at step 349, next level is selected (l=3), I=A.1.1 (ingress border node of PG A.1 at the lowest level), O is A.1.2 (egress border node of PG A.1 at the lowest level). The old connection is traced until A.1.2, and the iteration return to step 333.

The step 333 is now "yes" as N is set equal to zero, at step 335, E is set to be A.1.3 (ancestor of t at level 3, level 3 being the lowest level). At step 339; O=A.1.2, and flat-network determination procedure is applied at level 3 with f=A.1.1, o=A.1.2, t=A.1.3. The optimal crossover node X is A.1.2.

At step 341, as E is not equal to X, so N is set to be node following X toward t, N=A.1.3.

At step 347, it is determined that the lowest level of the network has been reached, thus, X is the optimal crossover node for the network (step 351). At step 353, the connection is set between X (A.1.2) and t (A.1.3).

The above describes the steps involved in a base rerouting for a hierarchical network in the form of an example.

FIGS. 3A, 3B, 3C are also applicable for a PNNI hierarchical network.

Step 301 is same where f, o, and t are determined. At step 303 it is determined, if node o is closer to f or to t.

If o is closer to f than to node t, then there is not any path common between f-o segment and the new desired connection f-t, the crossover node is the node f (step 305). If node o is not closer f than to t, the crossover node is the ingress node of peer group where node t and node o are located.

In a particular case, if node t is closer to the node f than to the node o or is equi-distant to the node f and the node o, there is no segment common between the existing connection and the new desired connection. Then, the crossover node is again f.

In a PNNI hierarchical network, the crossover node determined in step 307 is a constrained-optimal crossover node because under every node has only the summarized information regarding the topology of the network (nodes outside of a peer group do not have information regarding internal structure of the peer group). The connections are routed using only source routing. Thus, when a connection is routed to a target node outside the peer group, such connection terminates at the ingress border node of the peer group comprising such target node. The routed connection cannot be extended up to the target node as the internal details of the peer group comprising target node are unknown to the nodes outside the peer group, thus, the ingress node is the desired crossover node.

The above explanation described a one phase handoff scheme where optimally routed connection is obtained by first determining an optimal "crossover node" along the path and then the handoff is effected by altering the existing connection route so that it travels along the existing path until it reaches the crossover node, where the path then varies from the original route and a new segment between the crossover node and the new location is established.

In a hard handoff case, the mobile data is switched to the new segment and the corresponding old segment on old connection is released. In a soft handoff case, both segments are maintained and data is allowed to communicate over both segments.

In an alternative embodiment, a two-phase handoff scheme is proposed. Referring now to FIG. 5, at step 701, the origination network node, old location network node, and new location network node of the user is determined. Next, in step 703, a handoff is performed by extending the existing connection from old location network node to the new location network node using the prior art path extension technique. The extended path is origination network node-old location network node-new location network node. This extended path is sub-optimal as it is a simple extension without any consideration to route optimization.

At step 705, route optimization technique is applied, in which a segment on the extended path is selected for rerouting then a crossover node is determined, and an optimal path is computed. A detailed explanation of the route optimization technique may be found in FIG. 6 and its related description.

After the optimal path has been computed, a new segment has been set up between the crossover node and node t, then, in step 707, the user data is switched to the new segment from the corresponding old segment. The corresponding old segment on the old connection is the segment between crossover node and old location. After the user data has been switched, the old segment is released in step 709.

FIG. 6 illustrates the steps involved in a route optimization step 705 of FIG. 6.

The route optimization mechanism is applicable where a sub-optimal path exists which must be made optimal. In a typical case, a sub-optimal path exists because of path extension performed in step 703 of FIG. 5. A sub-optimal path may also exist if the old connection experienced a fault and a fast reroute was performed around the location of the fault.

At step 501, origination network node, old location network node and new location network node are determined. The existing sub-optimal path comprises origination access point-old location network node-new location network node, and an optimal path is required between the origination network node and the new location network node.

There are two segments to this sub-optimal connection. The first segment is origination network node point-old location network node and the second segment is old location network node-new location network node. The next step 505 is a decision function to determine which of the two segments should be selected for routing. Either the first segment (origination network node-old location network node) segment will be routed towards new location network node or the second segment (old location network node-new location network node) will be routed towards origination network node.

This step involves selecting a segment of the sub-optimal path based on some set parameters. In preferred embodiment, this set parameter is distance. The process will select the segment which will reduce the distance of the connection path. Thus, first the distances both segments are determined.

If it is decided in step 505 that first segment is shorter than the second segment. The second segment will be rerouted toward the origination network node, this is accomplished by mapping origination network node to node t, the old location network node to node o, and the new location network node to node f in step 507.

If the second segment is shorter than the first segment, then the first segment will be rerouted towards the new location network node. This is accomplished by mapping the origination network node to node f, the old location point to node o, and the new location network node to node t.

Once f, o, t, nodes have been mapped, the route optimization technique relies on the base reroute method (FIG. 2–FIG. 4) to compute the crossover node X and setup a new segment X-t in step 511. To set up the new segment between the optimal crossover node and t, the identify of a physical level where optimal crossover node is located is required. If the physical level information is not available, the existing connection is traced by using prior art tracing protocol. The prior art provides COS_SELECT scheme where crossover switch select is sent along the existing connection. On receipt of the COS_SELECT message by optimal crossover node, the new segment is set up from the optimal crossover node to the target node.

Once the new segment has been set up, the data is switched from the old segment to the new segment in step 513 and old segment is released in step 514.

The above procedures are applicable for handoff management in a connection-oriented network e.g. a mobile ATM network. The above described procedure may be used for other communication networks including mobile IP networks.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

We claim:

1. A method for managing the handoff of a call on a hierarchical connection-oriented mobile network, said connection-oriented mobile network comprising a plurality of interconnectable access points and network switches, wherein a connection exists between a first access point and a second access point, and a new connection is desired between said first access point and a third access point, said method comprising:

determining a crossover node, said crossover node being a network switch located along the path of said existing connection, said step of determining the crossover node including selecting a level in said hierarchical connection-oriented mobile network at which ancestors of said second access point and third access points are siblings;

setting up a new connection path between said crossover node and said third access point; and connecting the call between said first access point and said third access point by switching the call along said new connection path.

2. The method as set forth in claim 1, further comprising the steps of:

determining an old segment path between said crossover node and said second access point; and releasing said old segment path back.

3. The method of claim 1, and wherein said step of determining a crossover node further comprises the steps of:

determining a shortest path between said first access point and said third access point along said plurality of interconnectable access points;

determining a portion of said shortest path and said existing connection that coincide; and determining a network switch on said coinciding portion of said shortest path and said existing connection that is farthest from said first access point, said network switch being said crossover node.

4. The method of claim 1, wherein said crossover node is said first access point.

5. The method of claim 1, wherein said step of determining said crossover node comprises the step of selecting said third access point or said second access point for initiation of said crossover node determination.

6. The method of claim 1, wherein said step of determining said crossover node is initiated at said second access point.

7. The method of claim 6, wherein said step of determining said crossover node further comprises the step of tracing back the path of said existing connection from said second access point to said crossover node.

8. The method of claim 1, wherein said step of determining said crossover node is initiated at said third access point.

9. The method of claim 1, wherein said of determining a crossover node further comprises the steps of:

determining a provisional crossover node;

determining whether a hierarchical path is available in said hierarchical network;

determining whether another network switch can further modify the existing path; and determining an optimal crossover node.

10. The method of claim 9, wherein said provisional crossover node is an ingress border of a peer group in which ancestors of said second access point and said third access point are siblings, and said provisional crossover node is said crossover node.

11. The method of claim 9, said provisional crossover node is the first access point.

12. The method of claim 9, said provisional crossover node is said crossover node.

13. The method of claim 9, said optimal crossover node is said crossover node.

14. The method of claim 9, wherein said step of determining optimal crossover node further comprises the steps of:

(ii) determining a shortest path between said first access point and said third access point along said plurality of interconnectable access points and network nodes;

(iii) determining a portion of said shortest path and said existing connection that coincide;

(iv) determining a network switch on said coinciding portion of said shortest path and said existing connection that is farthest from said first access point, said network switch being said crossover node;

(v) selecting the next lower level in said hierarchical network and apply the iteration of step (ii), (iii), (iv); and (vi) iteratively repeating steps (ii)–(v) until the lowest physical level in the hierarchical network has been reached.

15. The method of claim 14, wherein said crossover determination is initiated from said second access point.

16. The method of claim 15, wherein said crossover determination is initiated from said third access point.

17. The method of claim 1, wherein said hierarchical connection-oriented mobile network is a PNNI hierarchical network and said step of determining a crossover node comprises the steps of:

determining whether said second access point is closer to said first access point or to said third access point; and determining a crossover node under PNNI constraints.

18. The method of claim 17, wherein said first access point is said crossover node.

19. The method of claim 18, wherein said second access point is closer to said third access point than to said first access point, and said crossover node is an ingress border of a peer group in which ancestors of said second access point and said third access point are siblings.

20. A method for rerouting an existing connection in a hierarchical connection-oriented communications network to a new desired connection, wherein said existing connection is between a first network switch and a second network switch, and said new connection is desired between said first network switch and a third network switch, said connection-oriented communications network comprising a plurality of interconnectable network switches, said method comprising the steps of:

determining a crossover node, said crossover node being a network switch located along the path of said existing connection, said step of determining the crossover node including selecting a level in said hierarchical connection-oriented mobile network at which ancestors of said second access point and third access points are siblings; and setting up a new connection path between said crossover node and said third network switch.

21. The method as set forth in claim 20, further comprising the step of determining an old segment path between said crossover node and said second network switch.

22. The method of claim 20, and wherein said step of determining a crossover node further comprises the steps of:

determining a shortest path between said first network switch and said third network switch along said plurality of interconnectable network switches;

determining a portion of said shortest path and said existing connection that coincide; and determining a fourth network switch on said coinciding portion of said shortest path and said existing connection that is farthest from said first network switch, said fourth network switch being said crossover node.

23. The method of claim 20, said crossover node is said first network switch.

24. The method of claim 20, wherein said step of determining said crossover node comprises the step of selecting whether to use said third network switch or said second network switch for initiation of said crossover node determination.

25. The method of claim 20, wherein said step of determining said crossover node is initiated at said second network switch.

26. The method of claim 25, wherein said step of determining said crossover node further comprises the step of tracing back the path of said existing connection from said second network switch to said crossover node.

27. The method of claim 20, wherein said step of determining said crossover node is initiated at said third network switch.

28. The method of claim 20, wherein said hierarchical connection-oriented communications network is a hierarchical network, and said step of determining a crossover node further comprises the steps of:

determining a provisional crossover node;

determining whether a hierarchical path is available in said hierarchical network;

determining whether another network switch can further modify the existing path; and determining an optimal crossover node.

29. The method of claim 28, wherein said provisional crossover node is an ingress border of a peer group in which ancestors of said second network switch and said third network switch are siblings.

30. The method of claim 28, said provisional crossover node is said first network switch.

31. The method of claim 28, said provisional crossover node is said crossover node.

32. The method of claim 28, said optimal crossover node is said crossover node.

33. The method of claim 28, wherein step of determining optimal crossover node further comprises the steps of:

(ii) determining a shortest path between said first network switch and said third network switch along said plurality of interconnectable network switch;

(iii) determining a portion of said shortest path and said existing connection that coincide;

(iv) determining a fourth network switch on said coinciding portion of said shortest path and said existing connection that is farthest from said first network switch, said fourth network switch being said crossover node;

(v) selecting the next lower level in said hierarchical network and apply the iteration of step (ii), (iii), (iv); and (vi) iteratively repeating steps (ii)–(v) until the lowest physical level in the hierarchical network has been reached.

34. The method of claim 33, wherein said crossover determination is initiated from said second network switch.

35. The method of claim 33, wherein said crossover determination is initiated from said third network switch.

36. The method of claim 20, wherein said hierarchical connection-oriented communications network is a PNNI hierarchical network and said step of determining a crossover node comprises the steps of:

determining whether said second network switch is closer to said first network switch or to said third network switch; and determining a crossover node under PNNI constraints.

37. The method of claim 36, wherein said first network switch is the crossover node.

38. The method of claim 36, wherein said second network switch is closer to said third network switch than to said first network switch, and said crossover node is an ingress border of a peer group in which ancestors of said second network switch and said third network switch are siblings.

39. The method of claim 20, wherein said hierarchical connection-oriented communications network is a mobile network and said network switches are access points in said mobile network.

40. The method of claim 20, wherein said hierarchical connection-oriented communications network is a mobile network and said network switches are base stations in said mobile network.

41. The method of claim 20, wherein said hierarchical connection-oriented communications network is a mobile ATM network.

42. The method of claim 20, wherein said hierarchical connection-oriented communication network is a mobile IP network.

* * * * *